June 12, 1956   L. F. KREGER   2,749,599
PAINT ROLLER
Filed Jan. 30, 1953
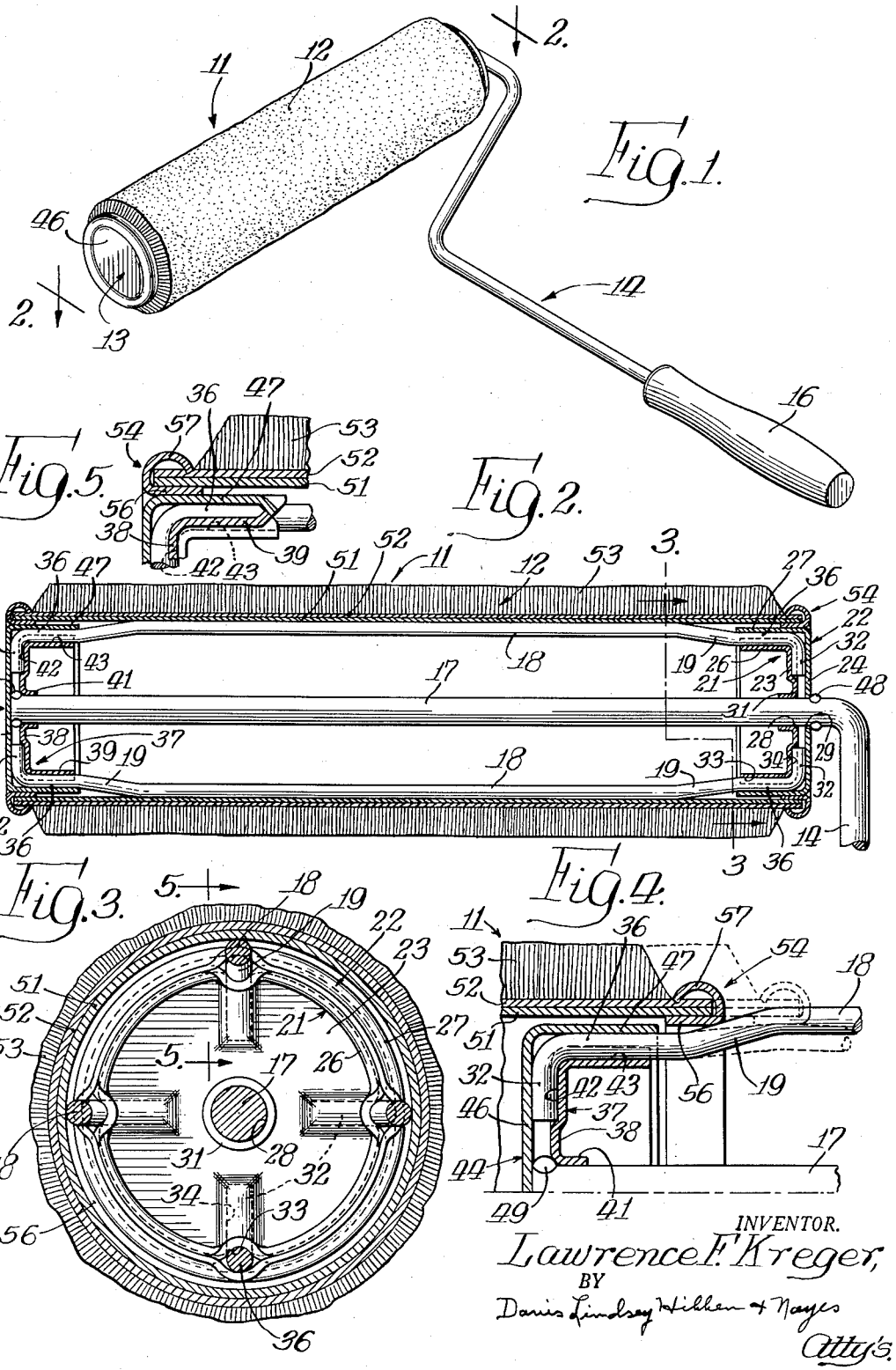
INVENTOR.
Lawrence F. Kreger,
BY
Davis Lindsey Hibben & Noyes
Atty's United States Patent Office 2,749,599
Patented June 12, 1956

2,749,599
PAINT ROLLER
Lawrence F. Kreger, Chicago, Ill.

Application January 30, 1953, Serial No. 334,315

8 Claims. (Cl. 29—116)

This invention relates to roller type fluid applicators for paint or the like and more particularly to a novel rotatable core structure for such applicators.

Roller type paint applicators have achieved a high degree of popularity, especially among home owners and other non-professional users. In general, a paint roller of this character comprises an applicator tube in the form of a heavy cardboard tube provided with an outer covering of lamb's wool, pile, or the like. This tube is mounted on a metal core structure of one type or another and the core structure is rotatably supported on an axle which constitutes the outer end portion of a generally T-shaped handle.

It is highly desirable to provide a relatively simple means for attaching and removing the applicator tubes in order to facilitate cleaning and replacement. Thus, the user may have a plurality of applicator tubes, which can be used interchangeably with a common handle and rotatable core structure, for different colored paints. From a manufacturing viewpoint this necessitates an inexpensive and uncomplicated core structure which can be fabricated and assembled at low cost and which is capable of having applicator tubes repeatedly mounted thereon and removed therefrom without impairment of either the tubes or the core structure.

Accordingly, a primary object of my invention is to provide a novel and improved core structure for a roller type applicator for paint or the like.

A further object of the invention is to provide an improved rotatable core structure of the class described above which is simple in construction, economical to manufacture, and capable of having applicator tubes repeatedly mounted thereon and removed therefrom.

Another object of the invention is to provide a novel and improved means for securing together the parts of a roller core structure of the class described above.

Other objects and advantages of the invention will become apparent from the subsequent detailed description taken in conjunction with the accompanying drawing, wherein:

Fig. 1 is a perspective view of an assembled paint roller embodying the features of my invention;

Fig. 2 is an enlarged longitudinal sectional view of the roller portion of the device as taken along the line 2—2 of Fig. 1;

Fig. 3 is a transverse sectional view taken along the line 3—3 of Fig. 2;

Fig. 4 is a fragmentary sectional view on an enlarged scale of a portion of the device shown in Fig. 2 and illustrating the manner of assembly of the device; and Fig. 5 is a fragmentary sectional view taken on the line 5—5 of Fig. 3.

Referring now to the drawing, a complete paint roller is shown in Fig. 1, including a roller or applicator tube 11 having an outer covering 12 of lamb's wool, pile, or the like and a rotatable core structure designated generally at 13, the core structure having the tube 11 detachably mounted thereon. For manipulating the roller, a generally T-shaped handle member 14 is provided having a grasping portion 16 at one end and a cross portion or axle 17 (Fig. 2) at the other end for rotatably supporting the core structure 13.

In Figs. 2, 3, and 5 the details of the core structure which constitutes the principal feature of the present invention are shown. This core structure includes a plurality of elongated supports or struts 18 formed from metal wire or the like and arranged in circumferentially spaced relation around the axle 17. The struts 18 are bowed outwardly at their central portions by reason of a plurality of outward bends 19 so that the struts can be compressed inwardly to a slight extent for frictionally engaging and firmly supporting the interior of the tube 11.

For supporting the struts 18 and rotatably mounting the core structure on the axle 17, I provide a special multiple-part cap construction at each end of the core. Thus, at the inner end of the axle 17 adjacent the handle connection 14, a pair of generally cup-shaped elements 21 and 22 having central disk portions 23 and 24 and axially-extending peripheral flange portions 26 and 27, respectively, are rotatably mounted in nested relation one within the other. The disk portions 23 and 24 are centrally appertured at 28 and 29, respectively, to receive the axle 17, and the disk portion 23 is formed with a short tubular extension 31 around the aperture 28 to provide a bearing portion. The adjacent ends of the struts 18 are received in tight frictional engagement or wedged relation between the nested cup-shaped elements 21 and 22, and the extreme end portions of the struts are bent radially inwardly, as at 32, to facilitate a rigid connection with the cup-shaped elements.

Moreover, to insure the rigidity of the connection and to retain the struts in predetermined circumferential spacing, the exterior of the innermost cup 21 is depressed to provide a plurality of L-shaped grooves extending axially, as at 33, along the flange 26 and radially, as at 34, along the disk portion 23. The radially-extending bent ends 32 of the struts 18 are received within the groove portions 34 and the adjacent longitudinal portions of the struts, designated at 36, are received within the groove portions 33 so that the struts 18 are thereby held in fixed relation to the cup 21. By the coaction of the nested cups 21 and 22 it will be seen that the strut portions 32 are frictionally clamped between the axially spaced parallel disk portions 23 and 24 and the strut portions 36 are also frictionally clamped between the concentric flange portions 26 and 27.

As a further feature of the invention, the flange portions 26 and 27 of the cup-shaped elements 21 and 22 are folded into overlapping relation at their free edges so as to retain the cups in assembled nested relation. Thus, as best seen in Figs. 3 and 5, the lips or free edges of the cups are bent into overlapping relation intermediate the longitudinally extending struts thereby contributing to the rigidity of the struts and also preventing circumferential displacement thereof as well as retaining the cups in nested relation. As illustrated in the drawing, the flange portion 27 of the outermost cup-shaped element 22 is preferably slightly longer than the corresponding flange portion 26 of the innermost cup-shaped element 21, and the outer flange 27 is preferably bent inwardly to overlie the top edge of the flange 26 on the inner cup. As seen in Fig. 3, when the cup flanges are bent into overlapping relation as just described, the flanges curve around and fit closely against the projecting portions of the struts so as to embrace the latter snugly. Accordingly, when the device is completely assembled, it is impossible to disturb the nested clamping relation of the cups 21 and 22.

At the opposite end of the core structure a similar double cup arrangement is also provided including an innermost cup 37 having an apertured disk portion 38, a flange 39, and a tubular bearing portion 41. The disk portion 38 and the flange 39 are formed with grooves 42 and 43, respectively, for receiving the end portions of the struts 18 in the same manner as hereinbefore described. However, in this case the outermost cup-shaped element, designated at 44, has a solid or imperforate disk portion 46 disposed beyond the free end of the axle 17 so that the axle does not extend through the outer cup-shaped element at this end of the device. The outermost cup 44 also has a flange 47 which coacts with the concentric inner flange 39 in the previously described manner. By eliminating the central aperture in the outermost cup 44, I avoid the protrusion of the free end of the axle 17 from the core structure thereby greatly simplifying cleaning of the device by eliminating the additional recesses and surface irregularities to which paint or other fluid can adhere.

Although any desired number of struts 18 may be utilized, I have found that four such struts are quite suitable for detachably supporting ordinary paint roller tubes or the like. As will be understood from the drawing, the struts 18 are arranged relative to the nested cups at the ends of the core structure so as to provide a more or less equal circumferential spacing of the struts. The core structure is retained in position on the axle 17 by suitable staked protuberances on the axle, as at 48 and 49.

The roller tube 11 consists of an inner tube 51 of cardboard, stiff paper, or the like and a suitable applicator covering is adhered to the exterior of the tube 51 by means of an appropriate adhesive or glue. In this case, the applicator covering comprises a supporting fabric or skin 52 (Fig. 2) which is adhered to the tube 51, the fabric or skin 52 being provided with an outermost surface 53 of lamb's wool or pile or other suitable material for soaking up and transferring paint or the like. As hereinbefore mentioned, the struts 18 of the core structure have an outwardly bowed or resilient construction and are adapted to be compressed or deflected inwardly to a slight extent upon insertion of the core structure into the roller tube whereby the struts 18 are pressed into tight frictional engagement with the interior of the cardboard tube 51. Thus, the roller tube is firmly mounted on the core structure for rotation with the latter about the axle 17 but at the same time the roller tube can be readily detached from the core structure whenever necessary.

A further feature of the invention resides in the provision of a pair of grommets or end caps, indicated generally at 54, at the opposite ends of the roller tube 11. These grommets are made from a rigid material, preferably metal, and have an inner axially extending portion 56 (Figs. 4 and 5) engaging the interior of the cardboard tube 51 and an axially extending curved portion 57 which extends over the outside of the tube 51 and resiliently grips the end extremities of the fabric layer 52. Usually the applicator covering is applied to the tube 51 by winding the fabric 52 in spiral fashion around the tube 51, and I have found that there is a marked tendency for the fabric 52 to become detached at the ends of the tube even with the best adhesive materials. However, the outer lip portions 57 of the grommets 54 function effectively to retain the ends of the applicator covering in place on the roller tube thereby avoiding this source of difficulty.

Moreover, the grommets 54 perform another important function in my invention which can best be explained by reference to Fig. 4. It will be understood that the tube and core structure are assembled by inserting the core structure axially into one of the open ends of the tube. While pushing the core structure axially into the tube, or vice versa, the end portions of the tube coact with the outwardly bowed struts 18 thereby compressing the latter slightly in order to provide the desired tight frictional fit of the roller tube on the core structure. In Fig. 4, I have illustrated in full lines the roller tube 11 in the process of being pushed onto the core structure 13, and it will be seen that the metal grommet 54 makes contact initially with the bent portions 19 of the struts 18 and that continued axial pressure against the roller tube 11 will cause the struts 18 to be compressed or deflected inwardly, as indicated in dotted lines. Thus, the coacting pressure necessary to compress the resilient core structure is confined entirely to deflecting engagement between metallic parts, namely the grommet 54 and the struts 18. In this way, I am able to avoid the wearing away and attrition of the ends of the cardboard tube 51 which would result if the metal grommets were not provided.

From the foregoing it will be seen that my invention provides a very simple and inexpensive core structure for paint rollers or the like which is characterized by the ease with which roller tubes may be detached from and assembled on the core structure. Thus, the user may conveniently employ a plurality of roller tubes with only a single handle and core structure, and the tubes may be readily interchanged for cleaning or for painting with different colored paints. In addition, the provision of the special end members or grommets on the roller tube affords the highly advantageous coaction with the core structure so as to facilitate assembly of the device and also increase the effective life of the roller tube.

Although the invention has been described in connection with a particular structural embodiment thereof it will be understood that various modifications and equivalent means may be resorted to without departing from the scope of the invention as defined in the appended claims.

I claim:

1. A rotatable core structure for mounting the outer tube of a paint roller or the like comprising a plurality of elongated supports for frictionally engaging the interior of a roller tube, and a pair of generally cup-shaped clamping elements having axially-extending flanges and disposed in nested relation at each of the opposite ends of said supports, the opposite end portions of said supports extending between the nested clamping elements at each end of the structure and being frictionally clamped therebetween for holding the supports and the nested clamping elements in rigid assembled relation, and the flanges of each pair of said elements being folded in overlapping relation intermediate said supports for retaining said cup-shaped elements in nested relation.

2. A rotatable core structure for mounting the outer tube of a paint roller or the like comprising a plurality of elongated supports for frictionally engaging the interior of a roller tube, the opposite end portions of said supports being bent radially inwardly, means secured to the opposite ends of said supports for rotatably mounting the core structure on an axle, said means comprising a pair of coacting cup-shaped elements in nested relation at each end of the structure and each element having an end wall and an axially-extending flange with the radially-extending ends of said supports being frictionally clamped between the end walls of said cup-shaped elements for holding the supports and the cup-shaped elements in rigid assembled relation, and means securing together the flanges of each pair of cup-shaped elements whereby to retain the latter in nested relation.

3. A rotatable core structure for mounting the outer tube of a paint roller or the like comprising a plurality of elongated supports arranged in circumferentially spaced relation for frictionally engaging the interior of a roller tube, the opposite end portions of said elongated supports being bent radially inwardly, and a pair of generally cup-shaped elements at each of the opposite ends of the structure, each having a central disk portion and an axially-extending peripheral flange portion, the elements in each pair being nested one within the other with the respective disk portions thereof in parallel axially-spaced relation and the respective flange portions in concentric inner and outer relation, and the end portions of said supports extending into tight frictional engagement between the nested cup-shaped elements at each end of the structure with the radially-extending portions of said ends being clamped between the disk portions of the elements and the adjacent longitudinal portions of said supports being clamped between the flange portions of the elements whereby to retain said supports and said elements in rigid assembled relation.

4. The device of claim 3 further characterized in that the disk and flange portions of the innermost cup-shaped elements are provided with external grooves for receiving the bent end portions of said supports.

5. A rotatable core structure for mounting the outer tube of a paint roller or the like comprising a plurality of elongated circumferentially-spaced supports for frictionally engaging the interior of a roller tube, and a pair of nested cup-shaped members at each of the opposite ends of said supports having axially-extending concentric flanges, the end portions of said supports extending between the flanges of said nested cup-shaped members at each end of the structure and being frictionally clamped therebetween, and the portions of said concentric flanges intermediate said supports being folded toward each other in overlapping relation at their free edges whereby to retain the cup-shaped members and the supports in rigid assembled relation.

6. A rotatable core structure for mounting the outer tube of a paint roller or the like comprising a plurality of elongated circumferentially-spaced supports for frictionally engaging the interior of a roller tube, and a pair of nested cup-shaped members at each of the opposite ends of said supports having axially-extending concentric flanges, the end portions of said supports extending between the flanges of said nested cup-shaped members at each end of the structure and being frictionally clamped therebetween, and the free edges of the flanges on the outermost cup-shaped members being folded inwardly intermediate said supports to overlap the edges of the flanges on the corresponding innermost cup-shaped members whereby to retain the respective pairs of cup-shaped members in nested relation.

7. The device of claim 2 further characterized in that the flanges of each pair of cup-shaped elements are folded in overlapping relation intermediate said supports for retaining the elements in nested relation.

8. The device of claim 3 further characterized in that the outer ends of the concentric flange portions of each pair of cup-shaped elements are folded in overlapping relation intermediate said supports whereby to retain said elements in nested relation.

References Cited in the file of this patent

UNITED STATES PATENTS

| | | |
|---|---|---|
| 555,873 | Moore et al. | Mar. 3, 1896 |
| 902,623 | Subert | Nov. 3, 1908 |
| 1,631,835 | Schubert | June 7, 1927 |
| 1,640,670 | Schaeffer | Aug. 30, 1927 |
| 2,215,053 | Reese | Sept. 17, 1940 |
| 2,542,491 | Engel | Feb. 20, 1951 |
| 2,563,048 | Liebelt et al. | Aug. 7, 1951 |
| 2,675,605 | Thomas | Apr. 20, 1954 |